(No Model.) 2 Sheets—Sheet 1.

J. D. IHLDER.
STARTING BOX FOR ELECTRIC MOTORS.

No. 596,515. Patented Jan. 4, 1898.

Witnesses

Inventor
John D. Ihlder
by Foster & Freeman
Attorneys

THE NORRIS PETERS CO., PHOTO-LITHO., WASHINGTON, D. C.

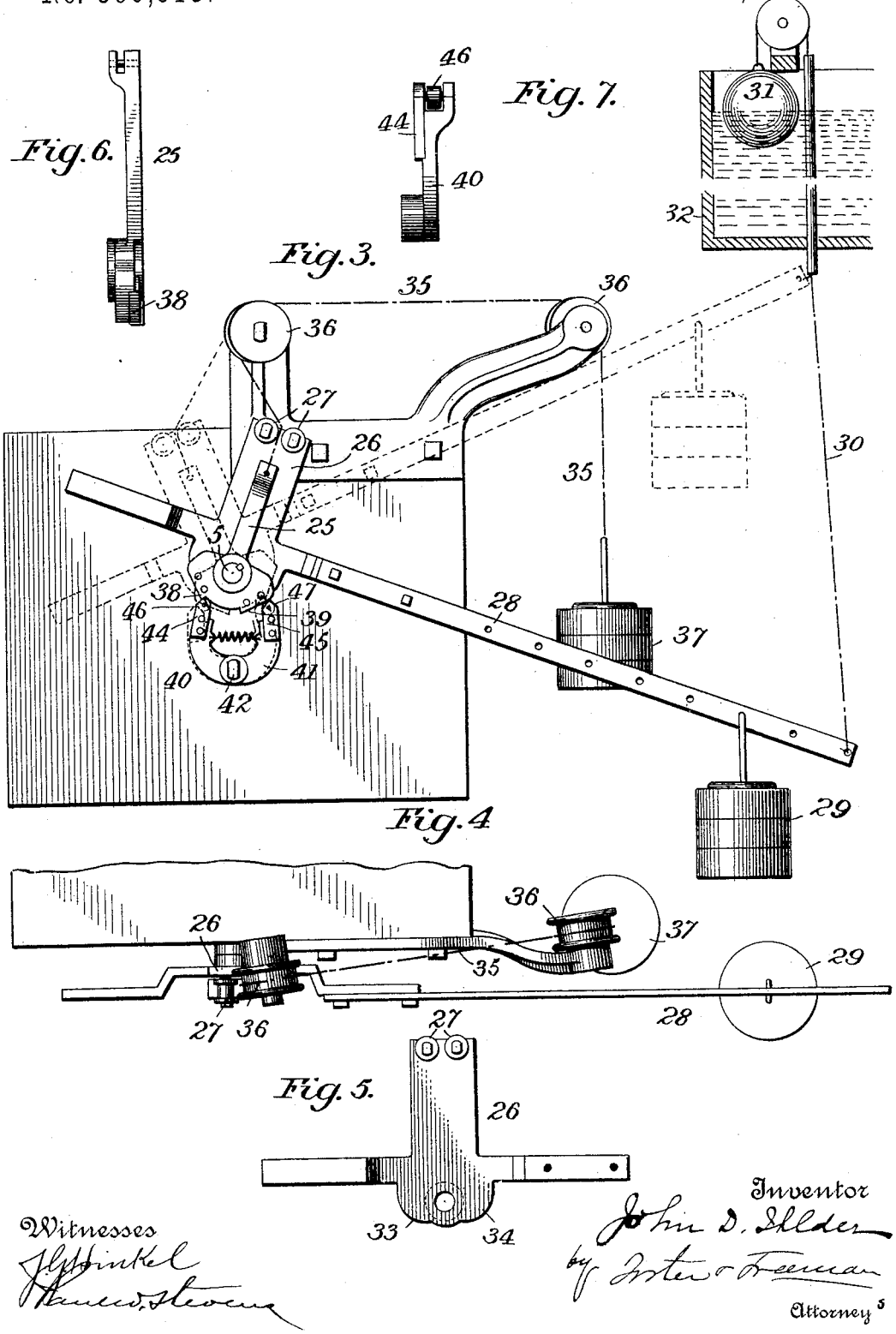

UNITED STATES PATENT OFFICE.

JOHN D. IHLDER, OF YONKERS, NEW YORK, ASSIGNOR TO THE OTIS BROTHERS & COMPANY, OF NEW YORK, N. Y.

STARTING-BOX FOR ELECTRIC MOTORS.

SPECIFICATION forming part of Letters Patent No. 596,515, dated January 4, 1898.

Application filed October 11, 1897. Serial No. 654,862. (No model.)

*To all whom it may concern:*

Be it known that I, JOHN D. IHLDER, a citizen of the United States, residing at Yonkers, Westchester county, State of New York, have invented certain new and useful Improvements in Starting-Boxes for Electric Motors, of which the following is a specification.

This invention relates to a starting-box for electric motors; and it has for its object to provide an improved box adapted to automatically start and stop electric motors, the starting and stopping to be controlled in various ways—as, for instance, when the motor is used to operate a pumping-engine the starting-box can be automatically operated from a float in the tank receiving water from the pump or by any other means as a pressure device, or when the motor is used for other purposes it can be controlled by other means; and to these ends the invention consists in the various features of construction and arrangement of parts having the general mode of operation substantially as hereinafter more particularly pointed out.

In the accompanying drawings is illustrated a preferred embodiment of the invention sufficient to explain the principles thereof, and in which—

Figure 1:
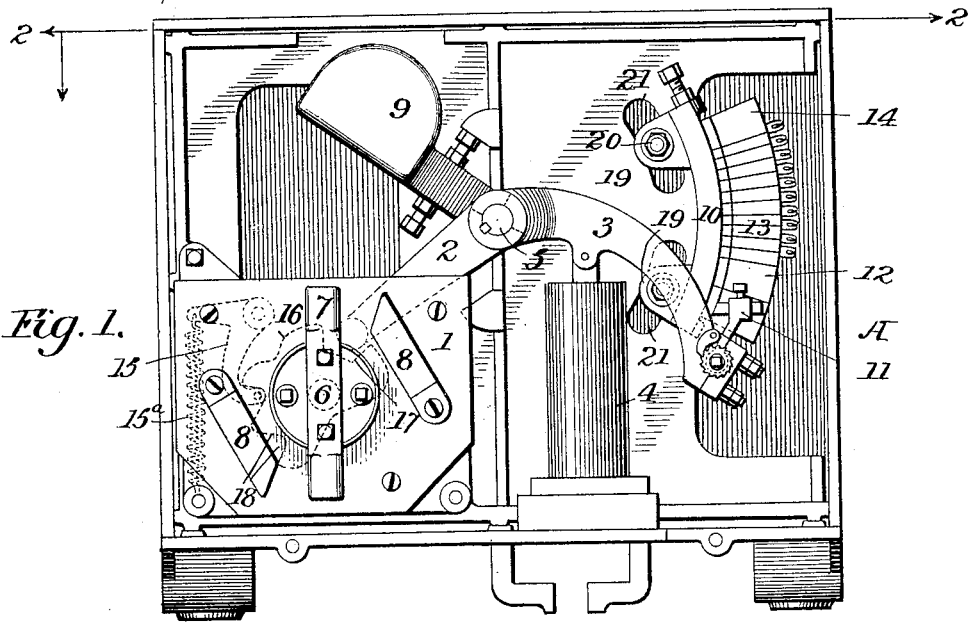
Figure 2:
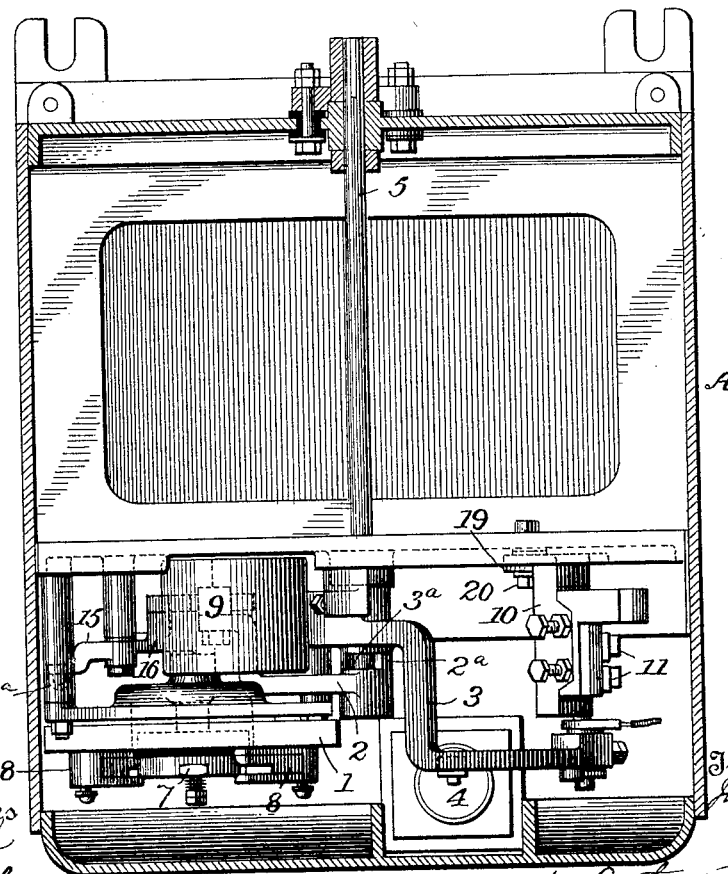

Figure 1 is an end view of a box, the outer end plate being removed. Fig. 2 is a horizontal sectional view of the box. Fig 3 is a side view of a means for automatically operating the starting-box; Fig. 4, a plan view of Fig. 3, and Figs. 5, 6, and 7 are detail views of some of the parts.

It is desirable to provide means whereby an electric motor can be automatically started and stopped when the motor is applied to drive machinery—such, for instance, as does not require the attention of an operator—as in operating pumps or other similar machines, and while it is deemed unnecessary to specify the many applications of such a device in the present instance it is shown embodied in an apparatus which is adapted to control a motor connected with a pumping-engine, and it will be understood that the details of construction and arrangement of parts can be varied without departing from the principles set forth in applying the invention to different purposes.

In the drawings, A represents a box of any suitable construction containing the operating mechanism, the essential features of which consist of a snap-switch 1, which may be of any desired construction, but which is preferably substantially like the one illustrated and which will hereinafter be more particularly described, an arm 2 for operating the snap-switch, and a brush-carrying arm 3, which brush operates in connection with a resistance device 10, the brush-arm 3 being in the present instance provided with a counterbalance 9 and controlled by a dash-pot 4 and being mounted on a shaft 5, by means of which it is operated in the manner hereinafter set forth.

The switch 1 comprises, essentially, a knife-blade 7, mounted on a pivot 6, adapted to engage and disengage the contacts 8 8, and connected to the knife is a cam 16, having a slot 17, into which the end of the arm 2 projects for moving the cam, and the cam is further provided with recesses and projections 18 18, with which coöperates a spring-catch 15, under the stress of a spring $15^a$, for holding the switch in different positions and for throwing it to complete its movement after it has been started, so as to produce the sudden engagement and disengagement in the manner well known in connection with snap-switches. The arm 2 is rigidly connected to the shaft 5, so as to move therewith, while the brush-carrying arm 3 is loosely mounted on the shaft 5, and interposed between the two arms is a catch or stop so arranged that the arm 2 may move independently of the arm 3 when the parts are in one position, but when it is moved in an opposite direction and the arm 3 is in another position they will move together. This catch may be variously constructed, but in the present instance it consists of a projection $2^a$ on the hub of the arm 2, working in a slot $3^a$ in the hub of the brush-carrying arm 3.

The brush-carrying arm 3 carries a brush 11, adapted to bear on the resistance-contact device 10, and the contacts are arranged so that the contact 12 will permit a considerable movement of the brush before any of the resistance is cut out, while the contacts 13 13 are connected by resistances in the usual way, but the contact 14 is connected directly with the line, so that while the brush is on the contact 12 all the resistance is included in circuit, and as it sweeps over the contacts 13 more or less of the resistance is cut out until it bears on the contact 14, when all the resistance is out of the circuit. This resistance device 10 in the present instance is made on the arc of a circle and is adjustable in the box by means of the lugs 19 and bolts 20 engaging the slots 21 in the frame of the box.

In Fig. 1 the circuit is shown open and all the resistance is included in the circuit, the catch $2^a$ bearing on one side of the slot $3^a$ of the brush-carrying arm 3, holding the parts in the position shown. If now the shaft 5 is turned in the direction of the arrow, the arm 2, operating through the cam 16, will move the switch-blade 7, so as to engage the contacts 8, the spring-catch 15 riding over the projection 18 and tending to complete the throw of the switch-arm as it enters the adjacent depression on the other side of the projection 18, making a snap-switch. The catch $2^a$ moves through the slot $3^a$ and leaves the brush-carrying arm 3 free to move, which, under the influence of the counterbalance 9, it commences to do at once, but its movement is retarded more or less by the dash-pot 4, and the parts are so arranged that before the brush 11 moves off from the resistance-contact 12 the switch 1 has closed the circuit through the contacts 8, and then the brush-carrying arm moves gradually over the resistance-contacts, cutting them out, until the brush 11 bears on the contact 14, by which time the motor has attained a sufficient speed to permit the full current to flow therethrough. When the shaft 5 is turned in the direction opposite to the arrow, the projection $2^a$ bears on the side of the slot $3^a$, so that as the arm 2 is turned to open the switch 1 the brush 11 is moved over the resistance-contacts, insuring the inclusion of the resistance in the circuit, and it will be noted that the slot 17 in the cam 16 is of such dimensions as to permit the inclusion of a greater part of the resistance-contacts before the knife-blade 7 is actually moved away from the contacts 8.

In order to operate the shaft 5, various means may be applied, and while of course it can be moved by hand it is preferable to provide some means whereby it may be automatically moved, especially where the motor is used to operate mechanism not requiring the attendance of an operator. In Figs. 3 to 7 is shown a simple device for operating the shaft 5 in connection with a float in a tank. It is evident that to produce a satisfactory operation the shaft 5 must make a full motion within a comparatively short space of time in order to close the switch and cut in or out the resistances. For instance, if a float were attached directly to a lever on the shaft 5, the lever would move in response to the motion of the float slowly up and down, and the resistance in the motor-circuit would be cut in and out at a slow rate, producing varying speeds of the motor, which under the conditions of discharge of the tank might produce a state of equilibrium in the supply thereto from the pump and discharge from the tank, so that the motor would be run at a slow speed and a part of the resistance would be included constantly in the circuit. Such a condition of affairs is to be avoided for the sake of economy and safety, and it is therefore necessary to have the shaft 5 make its full motion every time that the motor is to be started or stopped. To do this, there is used a double operating arm or arms, together with certain catches and stop devices shown in the figures referred to. Thus 25 represents an arm keyed upon shaft 5, and 26 is an arm loose on said shaft. The arm 26 has on its upward extension guides 27, and one of its lateral extensions is connected to an extension 28, on which is adjustably mounted a weight 29, and this extension is connected by a rope or chain 30 to the float 31 in the tank 32. The arm is also provided with cam-shaped projections 33 34. (Best shown in Fig. 5.) The arm 25 has connected to its upper end by a rope or chain 35, passing over the guide-pulleys 36, a weight 37, and this chain passes between the guides 27 on the arm 26. The lower portion of the arm 25 is provided with projections 38 39, arranged to operate with catches 40 41. These catches are pivotally mounted at 42 and are under the stress of a spring 43, and, as shown in Fig. 7, are provided with projections 44 45 and rollers 46 47.

Such being the general construction of the device the operation is substantially as follows: In the drawings the tank 32 is shown as being full, and the arm 28 is at its lowest position, while the arm 25 is at an angle thereto and is locked by the catch 44 engaging the projection 38, and the shaft 5 is in position to cut out the circuit of the motor. If now the water in the tank is lowered, the float 31 falls gradually, raising the arm 28, but this has no effect on the catch 44, as the roller 46 bears on the portion intermediate the cams 33 and 34 until the water reaches the desired position in the tank, when the cam-shaped projection 33 on the arm 28 comes in contact with roller 46 and disengages the catch 44 from the projection 38. The guides 27 will now be in the position indicated by dotted lines, Fig. 3, and the weight 37, through the cord or chain 35, will cause arm 25 to swing to the left until the catch 45 engages the projection 39. In this movement of the arm 25 the shaft has been rotated to close the circuit of the motor, and it will remain closed until the arm 25 is again moved. As the pump is operated and water flows into the tank the float 31 will gradually rise and the arm 28 be gradually lowered until it reaches the position indicated in full lines, when the cam-shaped projection 34 will come in contact with the roller 47, releasing the catch 45 from engagement with the projection 39, and again the stress of the weight 37 on the arm 25 will cause it to quickly assume the position shown in full lines in Fig. 3, turning the shaft 5 to cut out the circuit of the motor. It will thus be seen that while the float moves gradually or intermittently and the arm 28 moves in accordance with the float the arm 25 does not operate until the float has reached the desired position at the upper or lower portion of the tank, when it is released and by the force of the weight 37 is moved to operate the switch to cut in or out the circuit of the motor.

It will be observed that the arm 25 assumes its various positions with a comparatively rapid motion, allowing the resistance to be cut out by the counterbalance 9 in starting the motor and forcibly cutting it in in stopping the motor, and to do this the proportions of the weights 29 and 37 must be such that the weight 37 is able to move arm 25 and its connected shaft to operate the switch, while the weight 29 is sufficiently heavy to raise the weight 37 through the leverage of the guides 27 as arm 28 is elevated or depressed. Of course the float must be of such a size and weight that it controls weight 29. It will thus be seen that with this comparatively simple mechanism the motor is automatically controlled and the switch is quickly operated to make or break the circuit of the motor when the float in the tank reaches a predetermined position, according to whether the tank is full or practically empty, and between these extremes the motor is stationary. In other words, there is a quick-moving device connected to operate the switch to open or close it and a slow-moving device controlled by the conditions of the tank or the float therein, which slow-moving device controls the quick-moving device to allow the switch to be quickly opened or closed.

While weights are shown for moving the arms, of course any other device which will produce a strain upon them—such as a spring or a piston connected with the tank to be operated by variations in water-pressure or otherwise—can be readily substituted and the device operate in substantially the same manner.

What I claim is—

1. In a starting-box for electric motors, the combination with the switch, of a shaft, an arm connected to the shaft for operating the switch, a resistance device in the circuit, a brush-carrying arm loosely mounted on the shaft, and connections between the arms whereby when the switch-operating arm is moved in one direction the brush-carrying arm is free to operate and when it is moved in the other direction it is moved with the switch-operating arm, substantially as described.

2. In a starting-box for electric motors, the combination with the switch, of a shaft, a switch-operating arm mounted on said shaft, a counterbalanced brush-carrying arm, a resistance device, a retarding device for the brush-carrying arm, and connections between the switch-operating and brush-carrying arms whereby when the former is moved in one direction the latter is free to move and when the former is moved in the other direction the latter moves with it, substantially as described.

3. In a starting-box for electric motors, the combination with the switch, of a shaft, an arm rigidly connected to the shaft for moving the switch, a brush-carrying arm loosely connected to the shaft, a counterweight on said arm, a dash-pot connected to said arm, a resistance device over which the brush moves, the resistance device having a long contact at one end so that the switch will be closed before the brush-carrying arm cuts out the resistance, substantially as described.

4. In a starting-box for electric motors, the combination with the switch, of a cam-plate connected with the switch and having provision for lost motion, a shaft, a switch-arm rigidly connected to the shaft engaging the cam of the switch, a brush-carrying arm loosely mounted on the shaft, a resistance device controlled by the brush-carrying arm, the parts being arranged so that when the switch-arm is moved to open the switch the brush-carrying arm will be moved to cut in resistance before the switch is operated, substantially as described.

5. In a starting-box for electric motors, the combination with a snap-switch having a cam provided with means for reducing lost motion, of a shaft, a switch-carrying arm rigidly connected to the shaft and engaging the cam, a counterbalanced brush-carrying arm loosely mounted on the shaft, a dash-pot connected with said arm, a resistance device controlled by said arm, and connections between the two arms so that when the switch is operated to be closed the brush-carrying arm may move under the influence of the counterbalance and dash-pot and when the switch-arm is moved to break the circuit the brush-carrying arm is positively moved to cut in the resistance before the switch is operated, substantially as described.

6. In a starting-box for electric motors, the combination with the switch, of a shaft, an arm for operating the switch, a weighted arm connected to the shaft for operating it, means for holding the arm in different positions, and another arm connected to a float and arranged to release the catch to permit the shaft-operating arm to be operated, substantially as described.

7. In a starting-box for electric motors, the combination with the switch, of a shaft, an arm connected to the shaft for operating the switch, a weighted arm connected to the shaft, a catch for holding said arm in position, another arm loosely mounted on the shaft, means for moving said arm slowly in one direction or the other, and connections between said arm and said weighted arm on the shaft whereby when the former reaches the proper position the latter is permitted to operate to move the shaft and operate the switch, substantially as described.

8. In a starting-box for electric motors, the combination with the switch, of a shaft connected to operate the switch, a weighted arm fixed to the shaft, projections on said arm, catches engaging said projections, a slow-moving arm loosely mounted on the shaft, and cams on said arm for operating the catches and releasing the weighted arm, substantially as described.

9. In a starting-box for electric motors, the combination with the switch and means for moving it, of automatic means controlling the shaft comprising a quick-operating device for moving the shaft to operate the switch, and a slow-moving device for controlling the movements of the quick-moving device, substantially as described.

In testimony whereof I have signed my name to this specification in the presence of two subscribing witnesses.

JOHN D. HILDER.

Witnesses:
JAMES S. FITCH,
O. B. WARING.